(12) United States Patent
Hall et al.

(10) Patent No.: US 6,848,020 B2
(45) Date of Patent: Jan. 25, 2005

(54) COMMAND AGING METHOD FOR DATA STORAGE DEVICES

(75) Inventors: David R. Hall, Rochester, MN (US); Nyles N. Heise, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 09/995,368

(22) Filed: Nov. 27, 2001

(65) Prior Publication Data

US 2003/0115407 A1 Jun. 19, 2003

(51) Int. Cl.$^7$ .............................................. G06F 12/00
(52) U.S. Cl. ..................... 711/112; 711/154; 711/167; 711/169; 712/245; 718/102
(58) Field of Search .................... 711/111, 112, 114, 711/154, 167, 169; 712/245; 718/102, 103, 104, 105; 725/97

(56) References Cited

U.S. PATENT DOCUMENTS

| | | | | |
|---|---|---|---|---|
| 4,920,478 A | | 4/1990 | Furuya et al. ............... 711/136 |
| 5,684,971 A | * | 11/1997 | Martell et al. .............. 712/217 |
| 5,778,430 A | | 7/1998 | Ish et al. .................... 711/133 |
| 6,145,052 A | * | 11/2000 | Howe et al. ................ 711/112 |
| 6,170,042 B1 | * | 1/2001 | Gaertner et al. ............ 711/158 |
| 6,301,639 B1 | * | 10/2001 | Cleavinger et al. ......... 711/112 |
| 6,571,298 B1 | * | 5/2003 | Megiddo ........................ 710/5 |
| 6,574,676 B1 | * | 6/2003 | Megiddo ........................ 710/5 |
| 6,578,107 B1 | * | 6/2003 | Anderson et al. ........... 711/113 |
| 6,604,178 B1 | * | 8/2003 | Hall ............................ 711/167 |
| 6,691,208 B2 | * | 2/2004 | Dandrea et al. ............. 711/112 |
| 2002/0013864 A1 | * | 1/2002 | Dandrea et al. ................ 710/6 |
| 2003/0046497 A1 | * | 3/2003 | Dandrea ..................... 711/154 |
| 2003/0115407 A1 | * | 6/2003 | Hall et al. ................... 711/113 |

FOREIGN PATENT DOCUMENTS

EP              1 016 957 A2      7/2000

* cited by examiner

*Primary Examiner*—Nasser Moazzami
*Assistant Examiner*—Brian R. Peugh
(74) *Attorney, Agent, or Firm*—Gates & Cooper LLP; William D. Gill

(57) ABSTRACT

A method for aging queued commands in a data storage device, wherein a next command is selected from the queued commands based on a combination of an expected access time (EAT) and an incentive term. The incentive term provides for selection of older ones of the queued commands that have larger EATs, instead of younger ones of the queued commands that have smaller EATs. Preferably, the value of the incentive term begins at zero, remains at zero for some number of queue sorts (which are performed before a command is selected for execution), and then increases continuously for some number of queue sorts or indefinitely. Both the incentive term's starting value and the rate at which it increases ate user-selectable parameters, and thus can be used to control service time and throughput in the disk drive's queue.

44 Claims, 12 Drawing Sheets

COMMAND AGING METHOD FOR DATA STORAGE DEVICES

BACKGROUND OF THE INVENTION

1. Field of the Invention

The present invention relates generally to control systems used for data storage devices, and more particularly, to a system and method providing a command aging method that generates an incentive term for use with expected access times when selecting commands for execution in data storage devices.

2. Description of Related Art.

It is well known in the art to store data on magnetic or optical disk drives. Generally, data is stored on a disk drive on one or more tracks of predetermined format disposed on a disk-shaped recording media. The data is written to and read from the tracks in response to a read/write command issued by a host computer.

When a read/write command is issued by a host computer, it may be queued with other commands for the disk drive. Throughput in a queued disk drive can be optimized by selecting the command in the queue that has the minimum expected access time (EAT). EAT is the time required from the completion of one command to the start of the next, plus one revolution multiplied by the probability of a seek, read, or write error.

For example, consider a system with a single priority level, or where only the commands that are within one priority are selected. Consequently, at each selection time, commands are selected solely upon their EAT and not any other criterion.

The average service time (the time from a command's entrance into the queue until its exit from the queue), can be determined from the throughput and the average queue size. The average service time will be minimized by maximizing the throughput; however, some commands will remain in the queue far longer than average. Consequently, there is a need for a mechanism to place an upper limit on the maximum amount of time a command is queued, when excessive service times cannot be tolerated.

Typically, a system will force a command to be selected when it reaches some age limit, independent of its EAT. This may replace a potentially very fast command with a very slow one, thereby affecting throughput and average service time. The present invention, on the other hand, allows the system to control the incentive for aging commands to leave the queue, thus controlling the effect on throughput.

SUMMARY OF THE INVENTION

To minimize the limitations in the prior art described above, and to minimize other limitations that will become apparent upon reading and understanding the present specification, the present invention discloses a method, apparatus and article of manufacture for aging queued commands in a data storage device, wherein a next command is selected from the queued commands based on a combination of an expected access time (EAT) and an incentive term. The incentive term provides for selection of older ones of the queued commands that have larger EATs, instead of younger ones of the queued commands that have smaller EATs. Preferably, the value of the incentive term begins at zero, remains at zero for some number of queue sorts (which are performed before a command is selected for execution), and then increases continuously for some number of queue sorts or indefinitely. Both the incentive term's starting value and the rate at which it increases are user-selectable parameters, and thus can be used to control service time and throughput in the disk drive's queue.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized and structural changes may be made without departing from the scope of the present invention.

Overview

The present invention defines a command aging method for disk drive commands that are queued and then selected for execution according to their expected access times (EATs). The command aging method provides an increasing incentive term for aging commands that have larger EATs to be selected for execution, instead of younger commands that have smaller EATs. The incentive term is subtracted from the EAT, and the result is used to select a command for execution. Preferably, the value of the incentive term begins at zero, remains at zero for some number of queue sorts (which are performed before a command is selected for execution), and then increases continuously for some number of queue sorts or indefinitely. Both the incentive term's starting value and the rate at which it increases are user-selectable parameters, and thus can be used to control service time and throughput in the disk drive's queue.

Disk Drive Components

Figure 1:
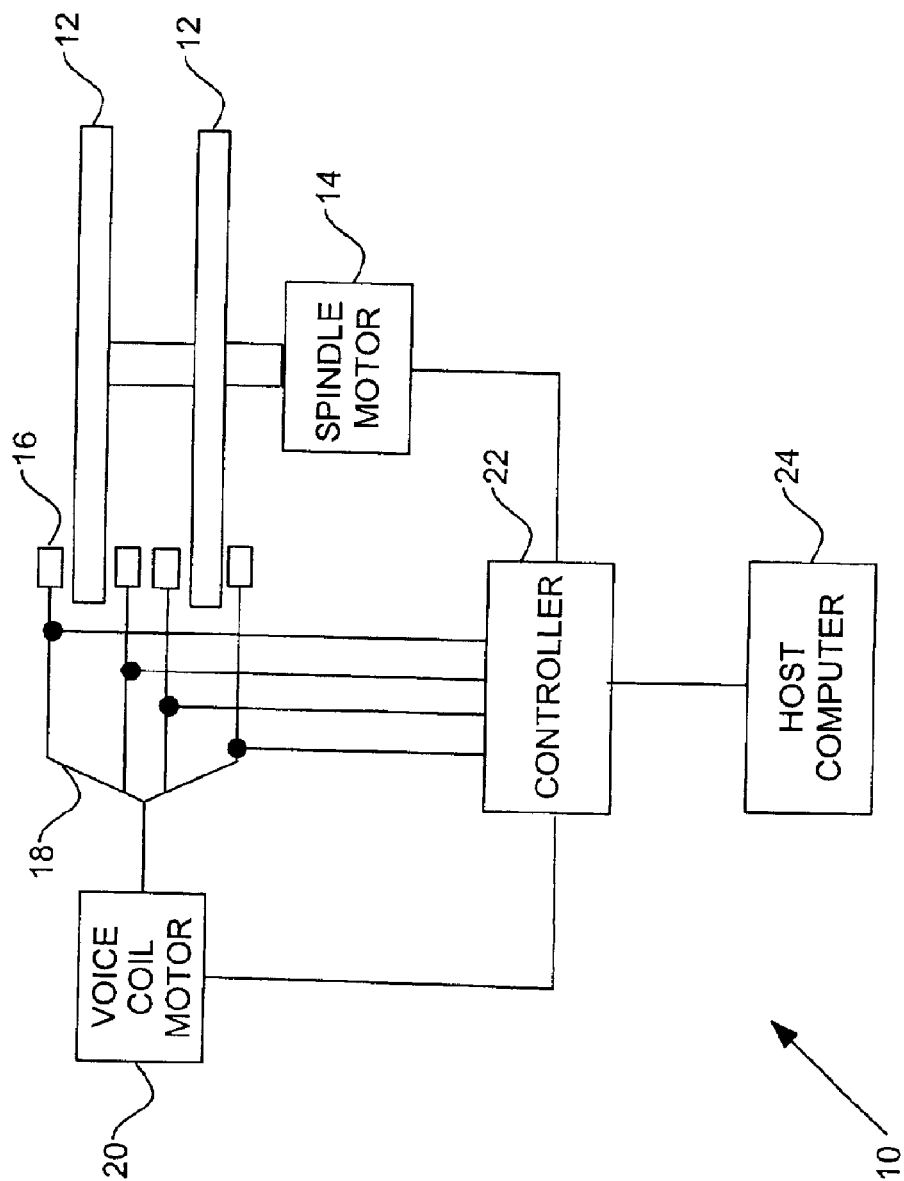
FIG. 1 is an illustration of an exemplary disk drive according to the preferred embodiment of the present invention.

FIG. 1 is a block diagram of an exemplary disk drive 10 according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 10 stores information on the surfaces of one or more stacked disks 12 in the form of transitions or patterns formed on one or more data tracks. The disks 12 are rotatably mounted on a spindle motor 14. Transitions are sensed or "read" from the disk 12 surfaces via one or more transducers 16, known as read/write heads, supported in close proximity to the disk 12 surfaces by a head positioning assembly 18, wherein the transducers 16 convert the transitions into electrical signals. The head positioning assembly 18 positions the transducers 16 over the disk 12 surfaces in a linear or rotary manner by operation of a voice coil motor (VCM) 20, which is controlled by a servo control loop that includes a servo controller 22.

Data is organized on the disks 12 using a series of concentric, radially spaced tracks, wherein a "cylinder" comprises a stack of these tracks across multiple disk 12 surfaces. Each track is divided into a plurality of sectors formatted in a predetermined, standard manner. The format specifies the sequence and location of certain types of information such as track number, sector number, data field, etc. A number of different formats may be used for the tracks.

When a read/write command is issued by a host computer 24, the servo controller 22 (or an interface processor or some other electronics within the disk drive 10) converts logical addresses, i.e., logical block addresses, into their respective physical addresses, i.e., cylinder, read/write head, and sector, and then proceeds to read from and/or write to the physical addresses by moving the read/write heads to the corresponding position on the disk 12 surfaces.

A read/write command issued by the host computer 24 may be queued by the controller 22 with other commands for the disk drive 10. The controller 22 optimizes throughput by selecting the command in the queue that has a minimum value resulting from the subtraction of an incentive term from an expected access time (EAT). The EAT is the time required from the completion of one command to the start of the next, plus one revolution multiplied by the probability of a seek, read, or write error. The incentive term includes a starting value, a delay, and a rate of increase.

Operation of the Preferred Embodiment

A number of assumptions are made concerning the operation of the preferred embodiment. First, a command has been selected for execution and is presently being operated upon by the disk drive. Second, two or more commands are in the queue for the disk drive when a selection processes begins. Finally, EATs and incentive terms are calculated for the commands in the queue, after which the command with a minimum value resulting from the subtraction of the incentive term from the EAT is the next selected command.

Normally, the calculation of EAT entails determining the time from the completion of the last block of the previous command until the next command's first block can be accessed after seek complete. This will be the rotational time between the two locations plus an integer multiplied by the rotation time. A delta EAT may be added to account for the probability of an additional revolution due to a seek, read, or write error, wherein the delta EAT is the probability of a missed revolution multiplied by the time necessary to complete one revolution.

The expected access time for an $n^{th}$ selection cycle and a $q^{th}$ command in the queue is denoted as $EAT_{n,q}$:

$$EAT_{n,q} = (SID_{n,q} - SID_{n-1}) \bmod SIDS\_PER\_REV +$$
$$m * SIDS\_PER\_REV +$$
$$p * SIDS\_PER\_REV$$

where:

$EAT_{n,q}$ is the expected access time for the $q^{th}$ command at the nth selection cycle, $SID_{n,q}$ is the rotational time for the $q^{th}$ command at the $n^{th}$ selection cycle, $SID_{n-1}$ is the rotational time of the previous command, SIDS_PER_REV is the total rotation time, mod is a modulo function, m is an integer that is determined by the minimum seek time, and p is the probability of a missed revolution.

The incentive term for an $n^{th}$ selection cycle and a $q^{th}$ command in the queue is denoted as $AGE\_EAT_{n,q}$:

$$AGE\_EAT_{n,q} = AGE\_RATE \cdot [(n-N_q) - AGE\_DELAY]$$

where:

AGE_DELAY is a selection cycle number indicating how long the incentive term remains at zero, AGE_RATE is a rate of increase for the incentive term, n is the selection cycle number, and $N_q$ is the selection cycle number when the $q^{th}$ command entered the queue. Note that, in one embodiment, the $AGE\_EAT_{n,q}$ remains set to zero until $(n-N_q)$ is greater than zero.

Thus, command selection is predicated on finding a command in the queue that has a minimum value of:

$$EAT_{n,q} - AGE\_EAT_{n,q}$$

The result of this method is that an aging command whose normal EAT would not be the minimum for a particular selection may become the selected command after the incentive term is subtracted from the EAT, thus leaving the queue earlier than would be indicated by the EAT alone and with minimum impact on the disk drive's throughput.

The distribution of command service times can be controlled by proper selection of the AGE_DELAY and AGE_RATE parameters. If long service times are of no importance, then these parameters can be set to zero, and there will be no impact on the disk drive's throughput. If only excessive service times are to be avoided, then AGE_DELAY can be set to a large number and AGE_RATE to a small number. In this case, only extreme service times are eliminated and the disk drive's throughput is only slightly affected. However, as the maximum allowable service time decreases, AGE_DELAY and AGE_RATE can be set to give the desired distributions with acceptable impact on the disk drive's throughput.

Figure 2:
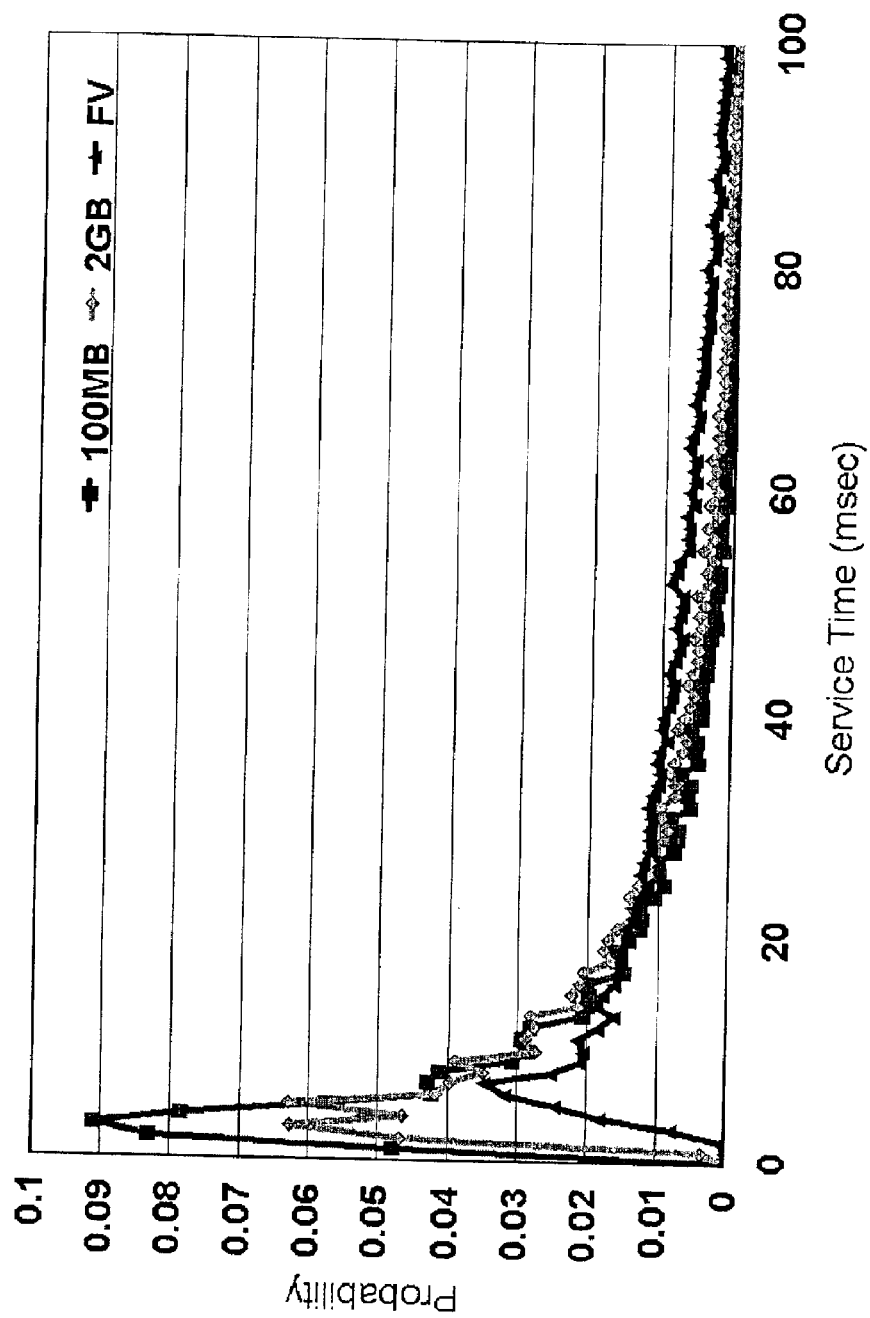
FIG. 2 is a graph that illustrates a typical Service Time distribution for a queued disk drive with single block, random reads at queue depth of 16 over 100 Mbytes, 2 Gbytes, and Full Volume (FV) without the proposed aging method.

FIG. 2 shows a typical Service Time distribution for a queued disk drive with single block, random reads at queue depth of 16 over 100 Mbytes, 2 Gbytes, and Full Volume (FV) without the proposed aging method. The statistics of these distributions are given in Table 1 below:

|  | IOs/Sec | Service Time Avg | Service Time STD | Service Time 95% | Service Time Max in 50000 |
| --- | --- | --- | --- | --- | --- |
| 100 MB | 968 | 16.5 | 18.8 | 53 | 220 |
| 2 GB | 674 | 23.7 | 26.0 | 74 | 359 |
| FV | 351 | 45.5 | 42.6 | 127 | 550 |

In the above table, "Service Time Avg" is the Average Service Time, "Service Time STD" is the Standard Deviation (STD) of the Service Time, "Service Time 95%" is the 95% point of the Service Time, and "Service Time Max in 50000" is the Maximum Service Time observed in the execution of 50,000 commands.

Although the most probable service times are short, 5% of the occurrences are several times greater than the average. And, in 50000 selections, at least one command can be expected to be 10 to 20 times the average.

Figure 3:
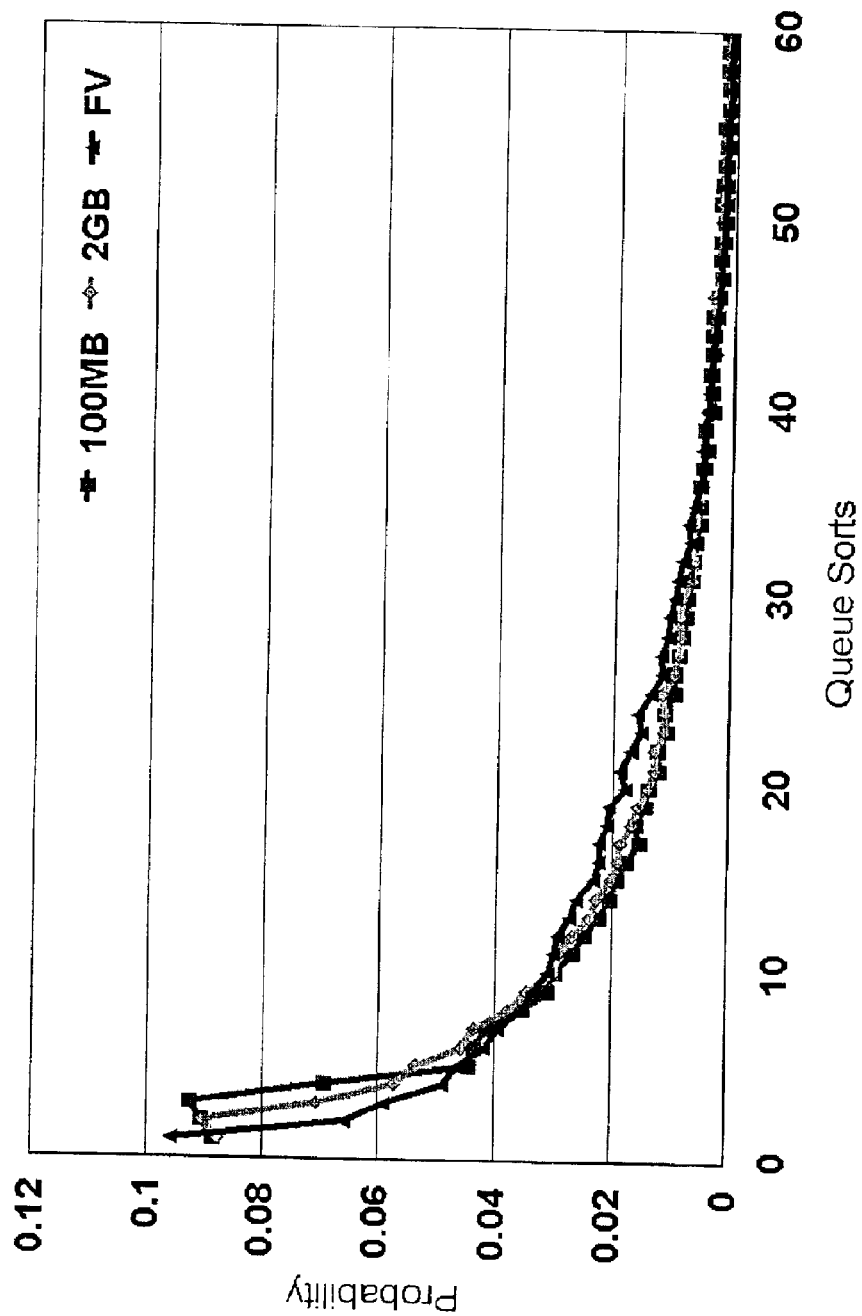
FIG. 3 is a graph that illustrates the results as the number of queue selections endured before exit without the proposed aging method.

FIG. 3 and Table 2 give the results as the number of queue selections endured before exit. Table 2 is provided below:

|  | Queue Selection Avg | Queue Selections STD | Queue Selections 95% | Queue Selections Max in 50000 |
| --- | --- | --- | --- | --- |
| 100 MB | 15 | 17.9 | 51 | 207 |
| 2 GB | 15 | 17.4 | 48 | 248 |
| FV | 15 | 14.9 | 43 | 184 |

In the above table, "Queue Selection Avg" is the Average Queue Selection, "Queue Selection STD" is the Standard Deviation (STD) of the Queue Selection, "Queue Selection 95%" is the 95% point of the Queue Selection, and "Queue Selection Max in 50000" is the Maximum Queue Selection observed in the execution of 50,000 commands.

As with FIG. 2 and Table 1, many commands leave early; however, some endure hundreds of selection cycles, even with queue depth of only 16.

Figure 4:
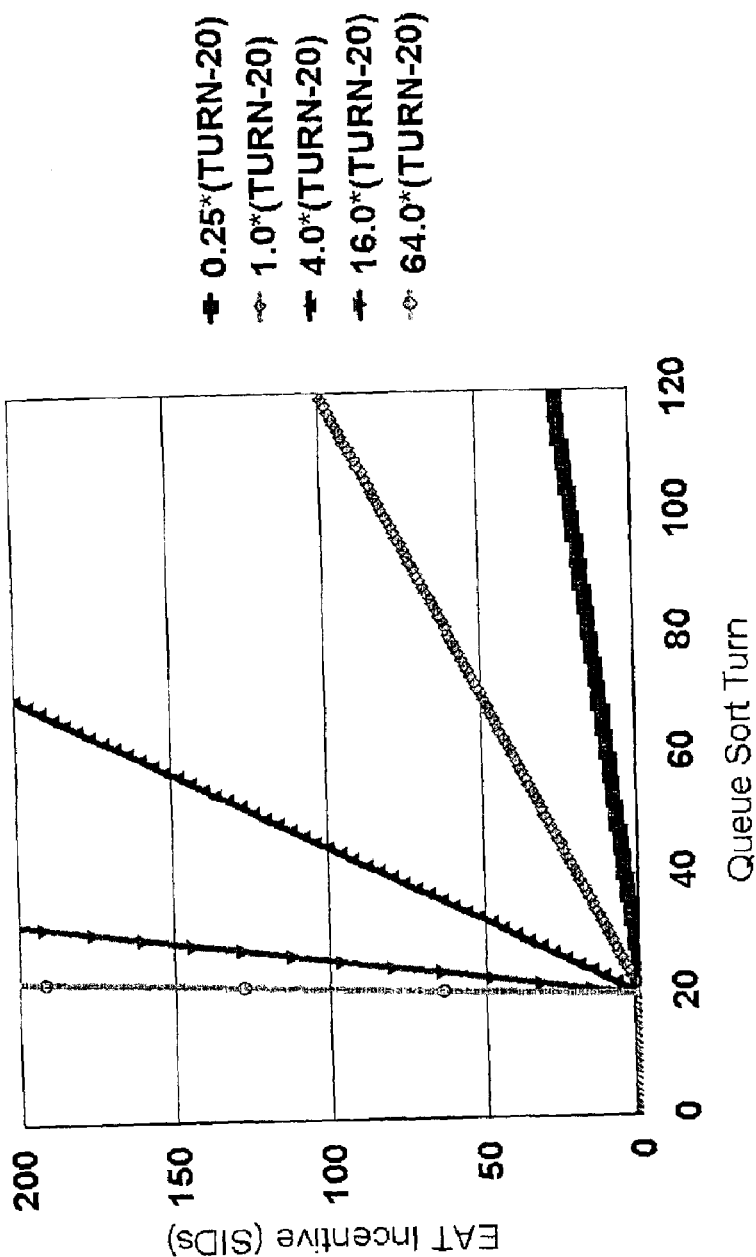
FIG. 4 is a graph that illustrates how the AGE_EAT incentive varies as a function of the number of queue selections with the proposed aging method.
Figure 5:
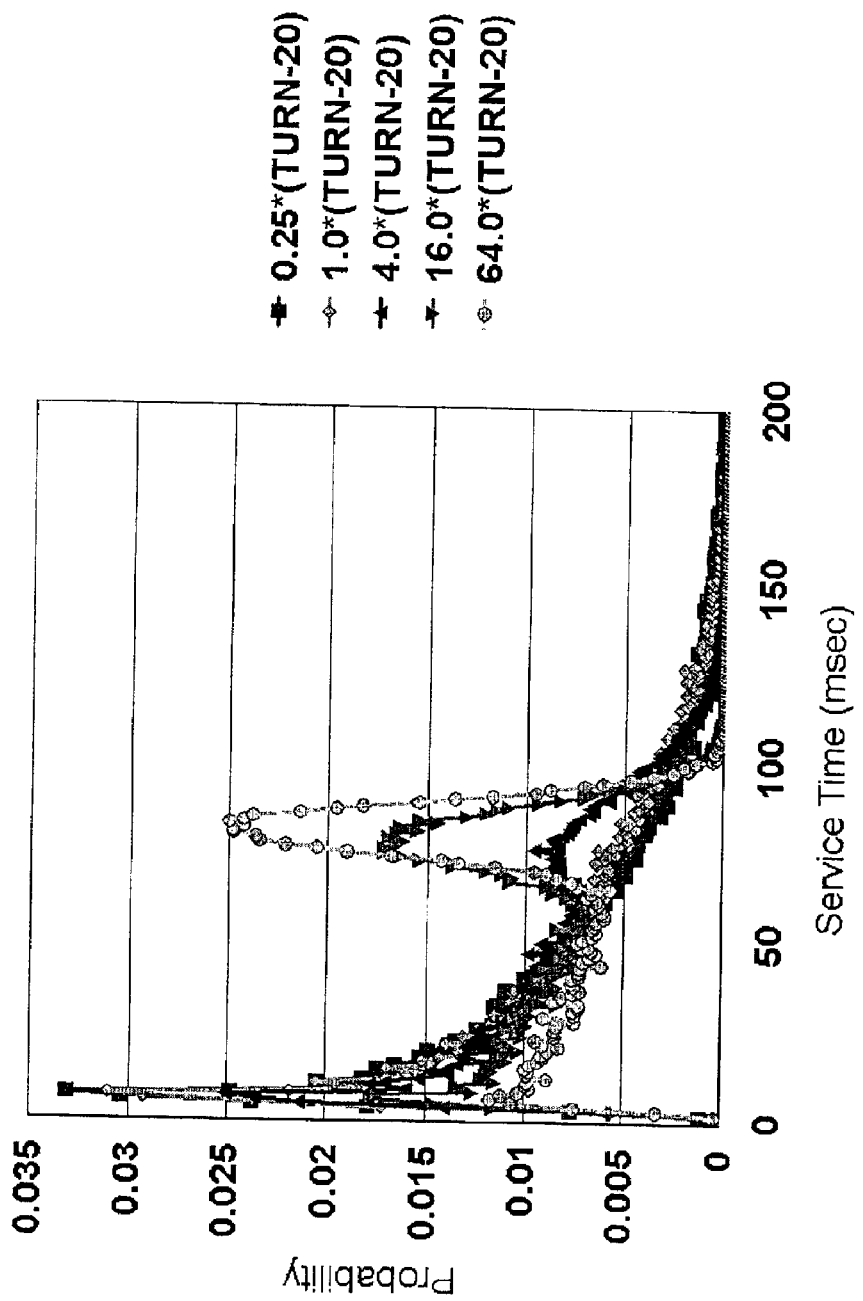
FIGS. 5 and 6 are graphs that illustrate the service time distribution and number of selection cycles endured with the proposed aging method.
Figure 6:
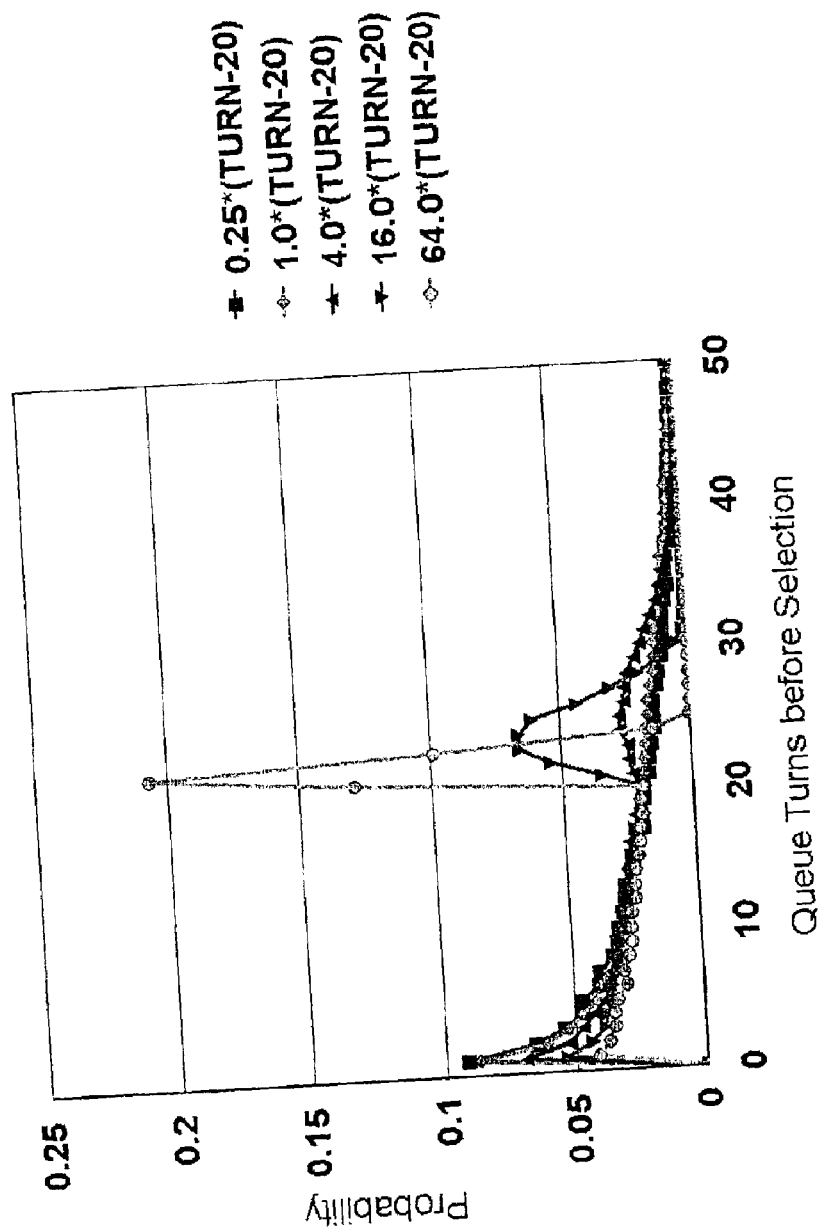
Figure 7:
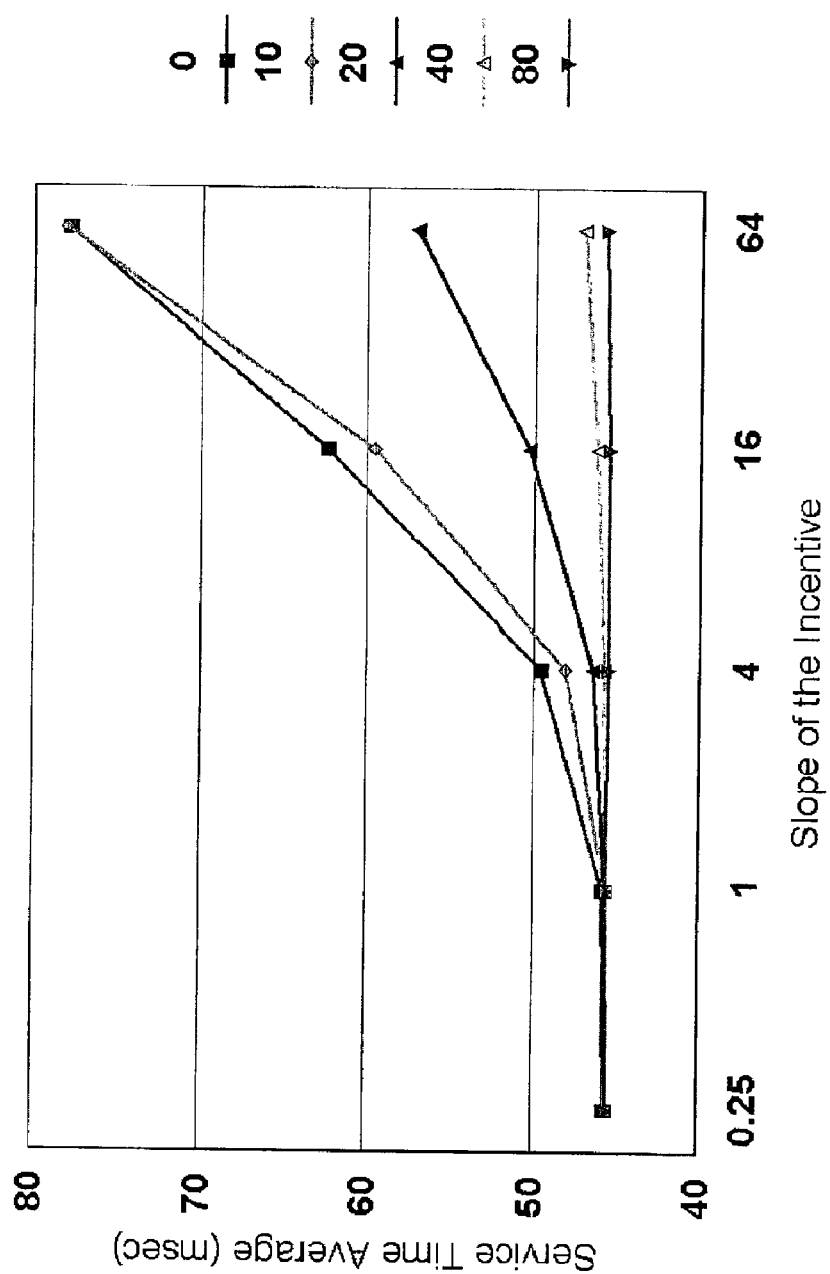
FIGS. 7 through 10 are graphs that illustrates the Average Service Time, standard deviation of the service time, 95% point, and maximum service time observed in a 50000 command run at full volume with the proposed aging method.
Figure 8:
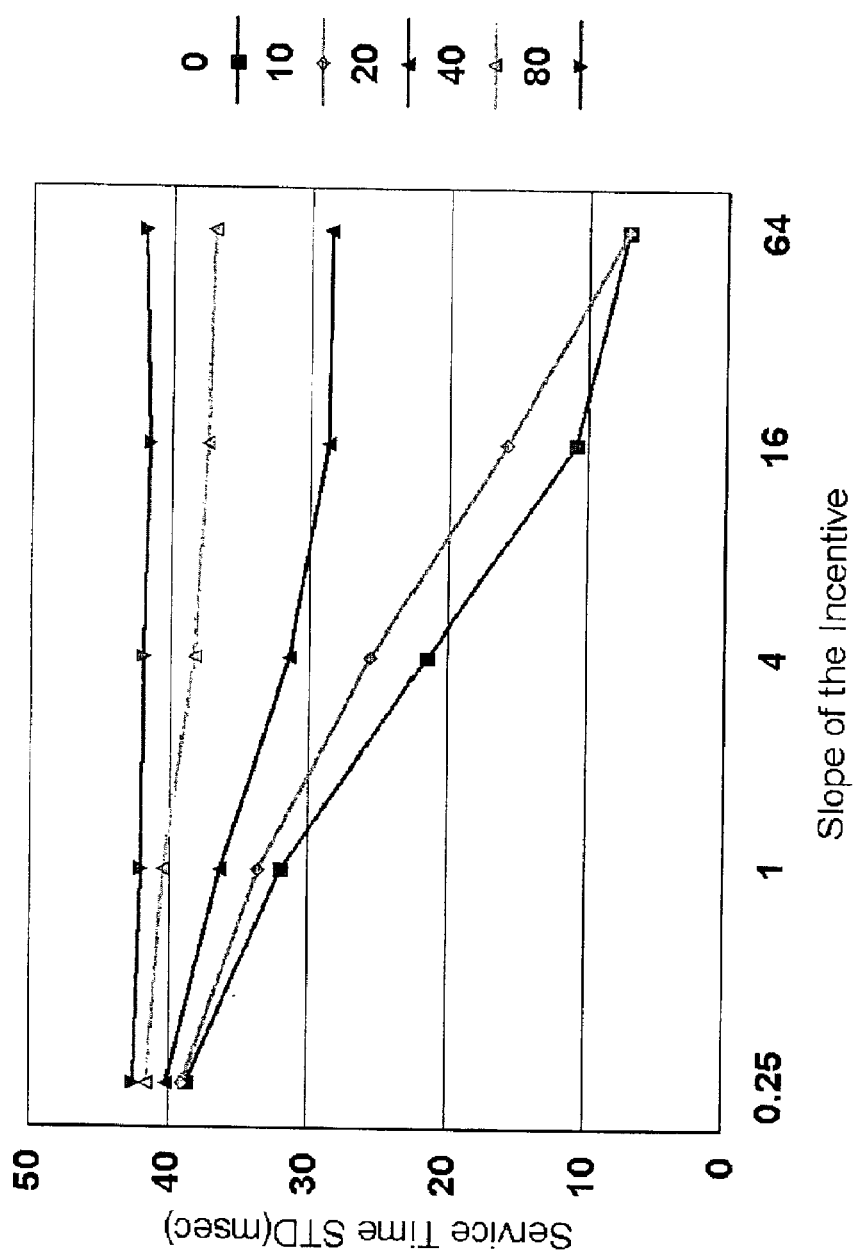
Figure 9:
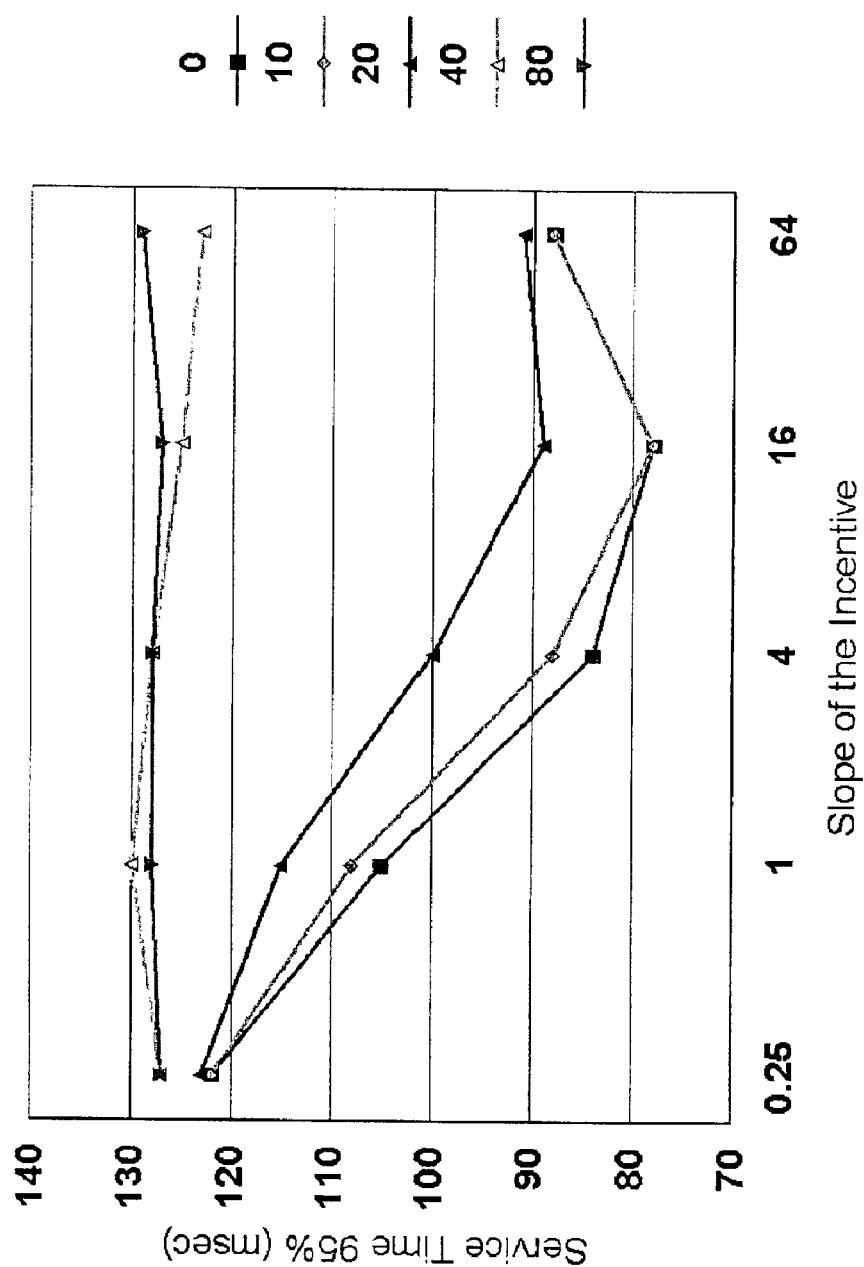
Figure 10:
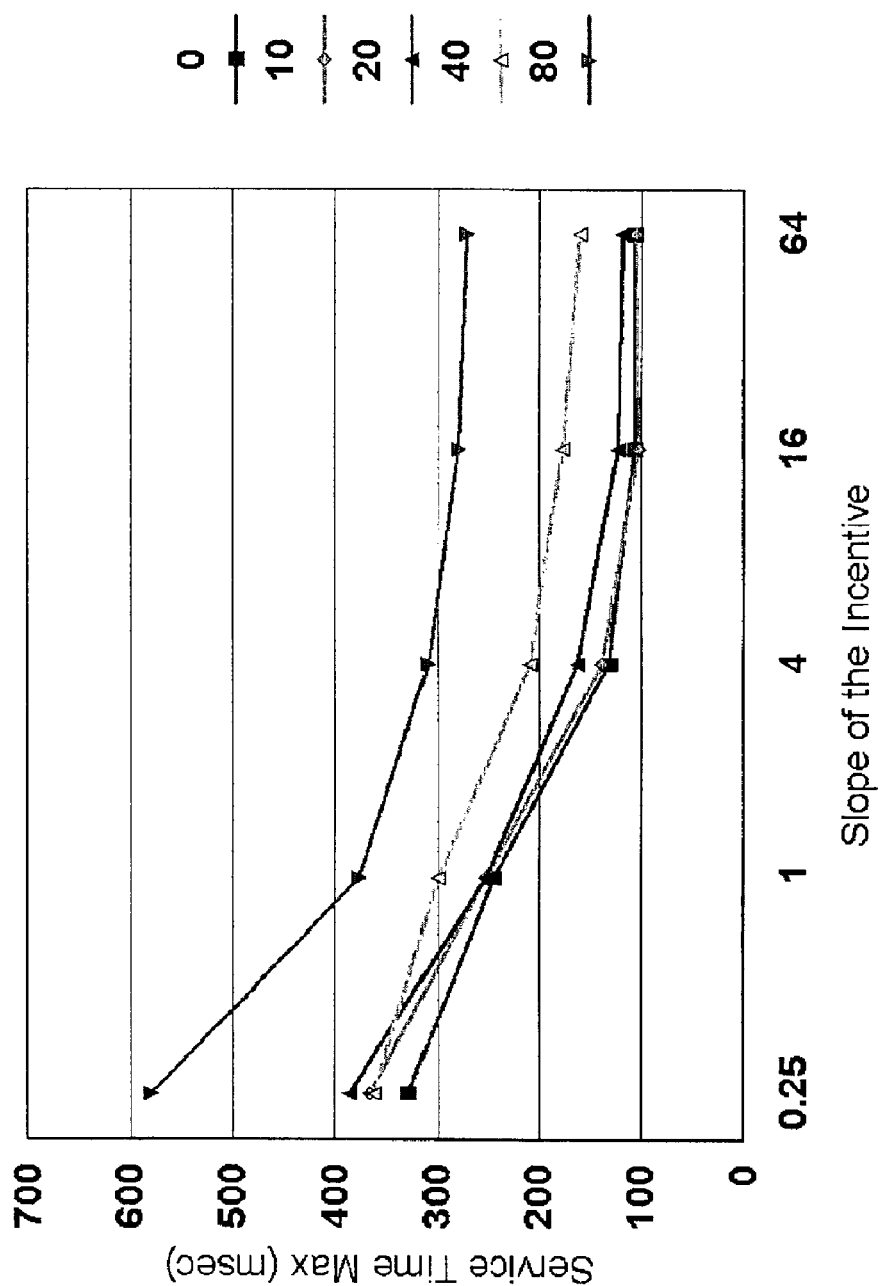

Consider an example where the aging incentive is applied. First, AGE_DELAY is set to 20 and AGE_RATE varied from 0.25 to 64. FIG. 4 shows how the incentive term, AGE_EAT, varies as a function of the number of queue selections endured. FIGS. 5 and 6 give the service time distribution and number of selection cycles endured for these cases.

Figure 11:
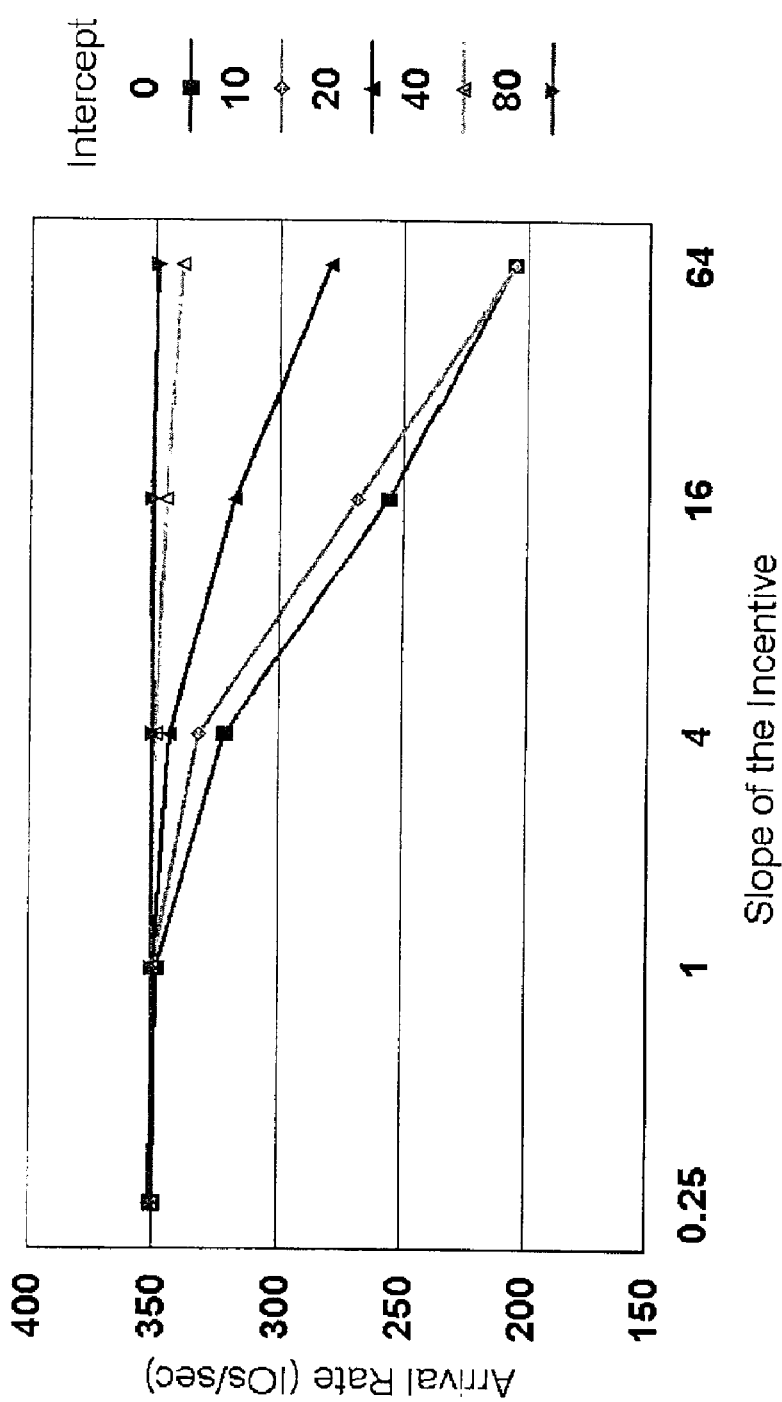
FIG. 11 is a graph that illustrates how the throughput is affected by aging with the proposed aging method.

Moreover, AGE_DELAY, as well as AGE_RATE, can be varied. FIGS. 7 through 10 show the Average Service Time, Standard Deviation (STD) of the Service Time, 95% point, and maximum service time observed in a 50000 command run at full volume. FIG. 11 shows how the throughput is affected by aging.

Logic of the Preferred Embodiment

Figure 12:
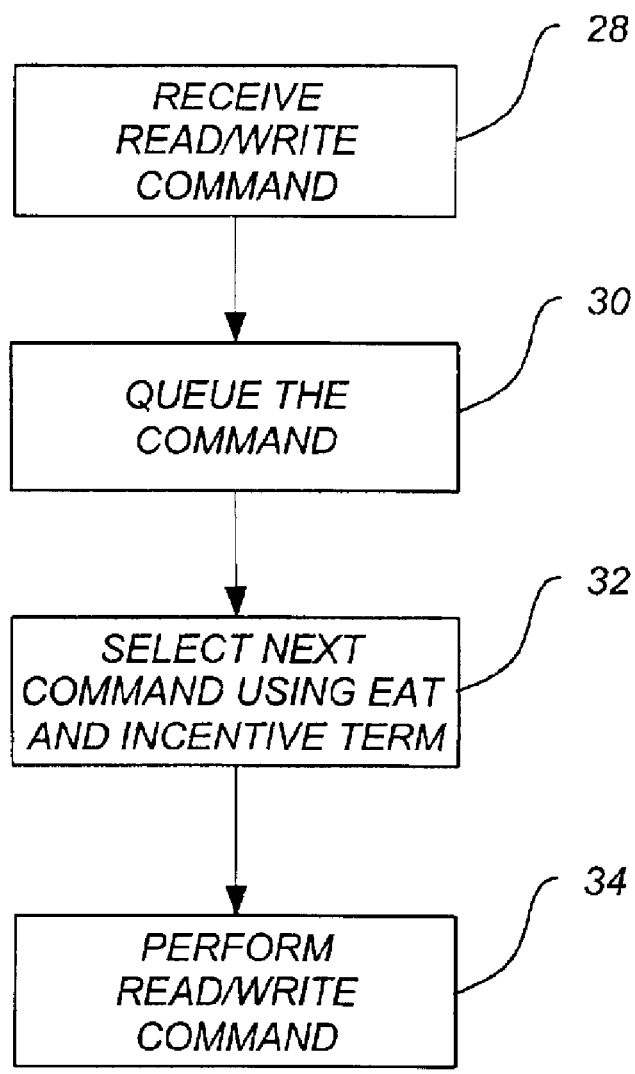
FIG. 12 is a flowchart that illustrates the logic performed by preferred embodiment of the present invention.

FIG. 12 is a flow chart illustrating the logic performed by the disk drive 10 (e.g., the controller 22 or some other device within the disk drive 10) according to the preferred embodiment of the present invention.

Block 28 represents the disk drive 10 receiving a read/write command.

Block 30 represents the disk drive 10 queuing the command.

Block 32 represents the disk drive 10 selecting a next command from the queued commands based on a combination of the EAT and incentive term, wherein the incentive term provides for selection of older ones of the queued commands that have larger EATs, instead of younger ones of the queued commands that have smaller EATs.

In the preferred embodiment, the combination of the EAT and the incentive term means that the incentive term is subtracted from the EAT, in order to determine whether the command should be selected for execution (i.e., the results of the subtraction are the smallest value of the commands in queue).

In the preferred embodiment, the expected access time for an nth selection cycle and a $q^{th}$ command is denoted as $EAT_{n,q}$:

$$EAT_{n,q} = (SID_{n,q} - SID_{n-1}) \bmod SIDS\_PER\_REV +$$
$$m * SIDS\_PER\_REV +$$
$$p * SIDS\_PER\_REV$$

where:

$SID_{n,q}$ is a rotational time for the qt command at the nth selection cycle, $SID_{n-1}$ is a rotational time of a previously selected command, SIDS_PER_REV is a total rotation time, m is an integer that is determined by a minimum seek time, p is a probability of a missed revolution, n is a selection cycle number, and $N_q$ is the selection cycle number when the $q^{th}$ command was queued.

In the preferred embodiment, the incentive term for an $n^{th}$ selection cycle and a $q^{th}$ command is denoted as $AGE\_EAT_{n,q}$:

$$AGE\_EAT_{n,q} = AGE\_RATE \cdot [(n-N_q) - AGE\_DELAY]$$

where:

AGE_DELAY is a selection cycle number indicating how long the incentive term remains at a zero value, AGE_RATE is a rate of increase for the incentive term, n is a selection cycle number, and $N_q$ is the selection cycle number when the $q^{th}$ command was queued.

In one embodiment, the $AGE\_EAT_{n,q}$ is set to zero, until $(n-N_q)$ is greater than zero. In another embodiment, the AGE_RATE and AGE_DELAY are set to control how fast the incentive term increases and how many selection cycles to delay before the incentive term is increased. In yet another embodiment, the AGE_RATE and AGE_DELAY are set to zero, when long service times are of no importance. In still another embodiment, the AGE_RATE is set to a small number and AGE_DELAY is set to a large number, when only excessive service times are to be avoided.

Block 34 represents the disk drive 10 performing the selected command.

Conclusion

This concludes the description of the preferred embodiment of the present invention. Generally, preferred embodiment of the present invention is implemented as programming within a controller, or some other device within the data storage device. This programming comprises instructions and/or data that is embodied in or retrievable from a device, medium, or carrier. Moreover, these instructions and/or data, when read, executed, and/or interpreted, perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different devices. For example, any device using queued commands could benefit from the present invention. Moreover, different logic could be used to implement the present invention.

In conclusion, the present invention discloses a method, apparatus and article of manufacture for aging queued commands in a data storage device, wherein a next command is selected from the queued commands based on a combination of an expected access time (EAT) and an incentive term. The incentive term provides for selection of older ones of the queued commands that have larger EATs, instead of younger ones of the queued commands that have smaller EATs. Preferably, the value of the incentive term begins at zero, remains at zero for some number of queue sorts (which are performed before a command is selected for execution), and then increases continuously for some number of queue sorts or indefinitely. Both the incentive term's starting value and the rate at which it increases are user-selectable parameters, and thus can be used to control service time and throughput in the disk drive's queue.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for aging queued commands in a data storage device, comprising:
   (a) queuing one or more commands for the data storage device; and
   (b) selecting a next command from the queued commands based on a combination of an expected access time (EAT) and an incentive term, wherein the incentive term provides for selection of older ones of the queued commands that have larger EATs, instead of younger ones of the queued commands that have smaller EATs wherein the EAT is equal to the rime required from the completion of one command to the start of the next command plus one revolution multiplied by the probability of a seek, read, or write error, and wherein the incentive term includes a starting value, a delay, and a rate of increase.

2. The method of claim 1, wherein the combination of the expected access time and the incentive term comprises subtracting the incentive term from the expected access time.

3. The method of claim 1, wherein the incentive term is increased periodically.

4. The method of claim 1, wherein the incentive term begins at zero, remains at zero for a number of queue sorts, and then increases continuously while the command is queued.

5. The method of claim 1, wherein the incentive term's initial value and its rate of increase are parameters that control service time and affect throughput in the data storage device.

6. The method of claim 1, wherein the expected access time for an $n^{th}$ selection cycle and a $q^{th}$ command is denoted as $EAT_{n,q}$:

$$EAT_{n,q} = (SID_{n,q} - SID_{n-1}) \bmod SIDS\_PER\_REV +$$
$$m * SIDS\_PER\_REV +$$
$$p * SIDS\_PER\_REV$$

where:
   $SID_{n,q}$ is a rotational time for the $q^{th}$ command at the $n^{th}$ selection cycle,
   $SID_{n-1}$ is a rotational time of a previously selected command,
   $SIDS\_PER\_REV$ is a total rotation time,
   m is an integer that is determined by a minimum seek time, and
   p is a probability of a missed revolution.

7. The method of claim 1, wherein the incentive term for an $n^{th}$ selection cycle and a $q^{th}$ command is denoted as $AGE\_EAT_{n,q}$:

$$AGE\_EAT_{n,q} = AGE\_RATE * [(n-N_q) - AGE\_DELAY]$$

where:
   AGE_DELAY is a selection cycle number indicating how long the incentive term remains at zero,
   AGE_RATE is a rate of increase for the incentive term,
   n is a selection cycle number, and
   $N_q$ is the selection cycle number when the $q^{th}$ command was queued.

8. The method of claim 7, wherein the $AGE\_EAT_{n,q}$ is set to zero, until $(n-N_q)$ is greater than zero.

9. The method of claim 7, wherein the AGE_RATE and AGE_DELAY are set to control how fast the incentive term increases and how many selection cycles to delay before the incentive term's increases begin.

10. The method of claim 7, wherein the AGE_RATE and AGE_DELAY are set to zero, when long service times are of no importance.

11. The method of claim 7, wherein the AGE_RATE is set to a small number and AGE_DELAY is set to a large number, when only excessive service times are to be avoided.

12. A data storage device, comprising:
   a controller for queuing one or more commands for the data storage device, and for selecting a next command from the queued commands based on a combination of an expected access time (EAT) and an incentive term, wherein the incentive term provides for selection of older ones of the queued commands that have larger EATs, instead of younger ones of the queued commands that have smaller EATs wherein the EAT is equal to the time required from the completion of one command to the start of the next command plus one revolution multiplied by the probability of a seek, read, or write error, and wherein the incentive term includes a starting value, a delay, and a rate of increase.

13. The device of claim 12, wherein the combination of the expected access time and the incentive term comprises subtracting the incentive term from the expected access time.

14. The device of claim 12, wherein the incentive term is increased periodically.

15. The device of claim 12, wherein the incentive term begins at zero, remains at zero for a number of queue sorts, and then increases continuously while the command is queued.

16. The device of claim 12, wherein the incentive term's initial value and its rate of increase are parameters that control service time and affect throughput in the data storage device.

17. The device of claim 12, wherein the expected access time for an $n^{th}$ selection cycle and a $q^{th}$ command is denoted as $EAT_{n,q}$:

$$EAT_{n,q} = (SID_{n,q} - SID_{n-1}) \bmod SIDS\_PER\_REV +$$
$$m * SIDS\_PER\_REV +$$
$$p * SIDS\_PER\_REV$$

where:
- $SID_{n,q}$ is a rotational time for the $q^{th}$ command at the $n^{th}$ selection cycle,
- $SID_{n-1}$ is a rotational time of a previously selected command,
- SIDS_PER_REV is a total rotation time,
- m is an integer that is determined by a minimum seek time, and
- p is a probability of a missed revolution.

18. The device of claim 12, wherein the incentive term for an $n^{th}$ selection cycle and a $q^{th}$ command is denoted as $AGE\_EAT_{n,q}$:

$$AGE\_EAT_{n,q} = AGE\_RATE * [(n-N_q) - AGE\_DELAY]$$

where:
- AGE_DELAY is a selection cycle number indicating how long the incentive term remains at zero,
- AGE_RATE is a rate of increase for the incentive term,
- n is a selection cycle number, and
- $N_q$ is the selection cycle number when the $q^{th}$ command was queued.

19. The device of claim 18, wherein the $AGE\_EAT_{n,q}$ is set to zero, until $(n - N_q)$ is greater than zero.

20. The device of claim 18, wherein the AGE_RATE and AGE_DELAY are set to control how fast the incentive term increases and how many selection cycles to delay before the incentive term's increases begin.

21. The device of claim 18, wherein the AGE_RATE and AGE_DELAY are set to zero, when long service times are of no importance.

22. The device of claim 18, wherein the AGE_RATE is set to a small number and AGE_DELAY is set to a large number when only excessive service times are to be avoided.

23. An article of manufacture embodying logic for aging queued commands in a data storage device, comprising:
(a) queuing one or more commands for the data storage device; and
(b) selecting a next command from the queued commands based on a combination of an expected access time (EAT) and an incentive term, wherein the incentive term provides for selection of older ones of the queued commands that have larger EATs, instead of younger ones of the queued commands that have smaller EATs wherein the EAT is equal to the time required from the completion of one command to the start of the next command plus one revolution multiplied by the probability of a seek, read, or write error, and wherein the incentive term includes a starting value, a delay, and a rate of increase.

24. The article of manufacture of claim 23, wherein the combination of the expected access time and the incentive term comprises subtracting the incentive term from the expected access time.

25. The article of manufacture of claim 23, wherein the incentive term is increased periodically.

26. The article of manufacture of claim 23, wherein the incentive term begins at zero, remains at zero for a number of queue sorts, and then increases continuously while the command is queued.

27. The article of manufacture of claim 23, wherein the incentive term's initial value and its rate of increase are parameters that control service time and affect throughput in the data storage device.

28. The article of manufacture of claim 23, wherein the expected access time for an $n^{th}$ selection cycle and a $q^{th}$ command is denoted as $EAT_{n,q}$:

$$EAT_{n,q} = (SID_{n,q} - SID_{n-1}) \bmod SIDS\_PER\_REV +$$
$$m * SIDS\_PER\_REV +$$
$$p * SIDS\_PER\_REV$$

where:
- $SID_{n,q}$ is a rotational time for the $q^{th}$ command at the $n^{th}$ selection cycle,
- $SID_{n-1}$ is a rotational time of a previously selected command,
- SIDS_PER_REV is a total rotation time,
- m is an integer that is determined by a minimum seek time and
- p is a probability of a missed revolution.

29. The article of manufacture of claim 23, wherein the incentive term for an $n^{th}$ selection cycle and a $q^{th}$ command is denoted as $AGE\_EAT_{n,q}$:

$$AGE\_EAT_{n,q} = AGE\_RATE * [(n-N_q) - AGE\_DELAY]$$

where:
- AGE_DELAY is a selection cycle number indicating how long the incentive term remains at zero,
- AGE_RATE is a rate of increase for the incentive term,
- n is a selection cycle number, and
- $N_q$ is the selection cycle number when the $q^{th}$ command was queued.

30. The article of manufacture of claim 29, wherein the $AGE\_EAT_{n,q}$ is set to zero, until $(n-N_q)$ is greater than zero.

31. The article of manufacture of claim 29, wherein the AGE_RATE and AGE_DELAY are set to control how fast the incentive term increases and how many selection cycles to delay before the incentive term's increases begin.

32. The article of manufacture of claim 29, wherein the AGE_RATE and AGE_DELAY are set to zero, when long service times are of no importance.

33. The article of manufacture of claim 29, wherein the AGE_RATE is set to a small number and AGE_DELAY is set to a large number, when only excessive service times are to be avoided.

34. A method for aging queued commands in a device, comprising:
  (a) queuing one or more commands for the device; and
  (b) selecting a next command from the queued commands based on a combination of an expected access time (EAT) and an incentive term, wherein the incentive term provides for selection of older ones of the queued commands that have larger EATs, instead of younger ones of the queued commands that have smaller EATs wherein the EAT is equal to the time required from the completion of one command to the start of the next command plus one revolution multiplied by the probability of a seek, read, or write error, and wherein the incentive term includes a starting value, a delay, and a rate of increase.

35. The method of claim 34, wherein the combination of the expected access time and the incentive term comprises subtracting the incentive term from the expected access time.

36. The method of claim 34, wherein the incentive term is increased periodically.

37. The method of claim 34, wherein the incentive term begins at zero, remains at zero for a number of queue sorts, and then increases continuously while the command is queued.

38. The method of claim 34, wherein the incentive term's initial value and its rate of increase are parameters that control service time and affect throughput in the data storage device.

39. The method of claim 34, wherein the expected access time for an $n^{th}$ selection cycle and a $q^{th}$ command is denoted as $EAT_{n,q}$:

$$EAT_{n,q} = (SID_{n,q} - SID_{n-1}) \bmod SIDS\_PER\_REV + m * SIDS\_PER\_REV + p * SIDS\_PER\_REV$$

where:
  $SID_{n,q}$ is a rotational time for the $q^{th}$ command at the $n^{th}$ selection cycle,
  $SID_{n-1}$ is a rotational time of a previously selected command,
  SIDS_PER_REV is a total rotation time,
  m is an integer that is determined by a minimum seek time, and
  p is a probability of a missed revolution.

40. The method of claim 34, wherein the incentive term for an $n^{th}$ selection cycle and a $q^{th}$ command is denoted as $AGE\_EAT_{n,q}$:

$$AGE\_EAT_{n,q} = AGE\_RATE * [(n - N_q) - AGE\_DELAY]$$

where:
  AGE_DELAY is a selection cycle number indicating how long the incentive term remains at zero,
  AGE_RATE is a rate of increase for the incentive term,
  n is a selection cycle number, and
  $N_q$ is the selection cycle number when the $q^{th}$ command was queued.

41. The method of claim 40, wherein the $AGE\_EAT_{n,q}$ is set to zero, until $(n-N_q)$ is greater than zero.

42. The method of claim 40, wherein the AGE_RATE and AGE_DELAY are set to control how fast the incentive term increases and how many selection cycles to delay before the incentive term's increases begin.

43. The method of claim 40, wherein the AGE_RATE and AGE_DELAY are set to zero, when long service times are of no importance.

44. The method of claim 40, wherein the AGE_RATE is set to a small number and AGE_DELAY is set to a large number, when only excessive service times are to be avoided.

* * * * *